US012586134B1

(12) United States Patent
Vaidyanathan et al.

(10) Patent No.: US 12,586,134 B1
(45) Date of Patent: Mar. 24, 2026

(54) ARTIFICIAL INTELLIGENCE BASED SIGNAL TRANSFORMATION PLATFORM

(71) Applicant: ExlService Holdings, Inc., New York, NY (US)

(72) Inventors: Subha Vaidyanathan, Chennai (IN); Raja Jaipal, Chennai (IN); Natarajan Namasivayam, Chennai (IN); Naveen Boggarapu, Saint Augustine, FL (US); Elizabeth S. Demblowski, Pittsburgh, PA (US); John P. Fedorko, Carnegie, PA (US)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/215,170

(22) Filed: May 21, 2025

(30) Foreign Application Priority Data

Dec. 13, 2024　(IN) ............................. 202411098856

(51) Int. Cl.
| | |
|---|---|
| *G06Q 40/08* | (2012.01) |
| *G06F 16/25* | (2019.01) |
| *G06V 10/764* | (2022.01) |
| *G06V 10/774* | (2022.01) |
| *G06V 10/776* | (2022.01) |
| *G06V 10/82* | (2022.01) |

(52) U.S. Cl.
CPC ........... *G06Q 40/08* (2013.01); *G06F 16/254* (2019.01); *G06V 10/764* (2022.01); *G06V 10/774* (2022.01); *G06V 10/776* (2022.01); *G06V 10/82* (2022.01); *G06V 2201/03* (2022.01)

(58) Field of Classification Search
CPC .... G06Q 40/08; G06F 16/254; G06V 10/764; G06V 10/774; G06V 10/776; G06V 10/82; G06V 2201/03
See application file for complete search history.

(56) References Cited

U.S. PATENT DOCUMENTS

| | | | | |
|---|---|---|---|---|
| 11,055,789 | B1 * | 7/2021 | Tabak | .................... H04L 9/3239 |
| 11,449,951 | B1 * | 9/2022 | Allen | ..................... G06N 3/045 |

(Continued)

FOREIGN PATENT DOCUMENTS

| | | | | |
|---|---|---|---|---|
| WO | WO-2021084510 | A1 * | 5/2021 | ............. G06N 5/043 |
| WO | WO-2023096968 | A1 * | 6/2023 | ............... G06N 3/08 |

*Primary Examiner* — Ross Varndell
(74) *Attorney, Agent, or Firm* — Perkins Coie LLP

(57) ABSTRACT

The present disclosure describes a signal transformation computing system that can receive first alphanumeric data. Using at least a portion of the data, the computing system can generate an attribute set An, wherein the attribute set An comprises anatomy data. The computing system can use the first and second alphanumeric data to generate a data signal, wherein the data signal comprises: (i) the attribute set An, (ii) event data, and (iii) routing data. The routing data is determined or generated using the attribute set An by causing a trained model to process the attribute set An to generate a classifier for the data signal, and, using the classifier, generating the routing data. The routing data can include an agentic AI instruction, a target computing system identifier, or both. The generated classifier data can include a derivative generated using the first or second alphanumeric data. The derivative can be used to incrementally train the trained model.

17 Claims, 10 Drawing Sheets

(56)         References Cited

U.S. PATENT DOCUMENTS

| 2009/0281841 | A1* | 11/2009 | Basak | ................... | G06Q 40/02 |
| | | | | | 705/4 |
| 2010/0235285 | A1* | 9/2010 | Hoffberg | .............. | G06Q 50/188 |
| | | | | | 705/37 |
| 2020/0320638 | A1* | 10/2020 | Erickson | ................ | G06N 20/00 |
| 2021/0383480 | A1* | 12/2021 | Tabak | ................... | H04L 9/3247 |
| 2025/0117727 | A1* | 4/2025 | Osborne | .......... | G06Q 10/06316 |

* cited by examiner

100

SYSTEM 106

NETWORK 104

102

102-1

102-2

102-3

...

900

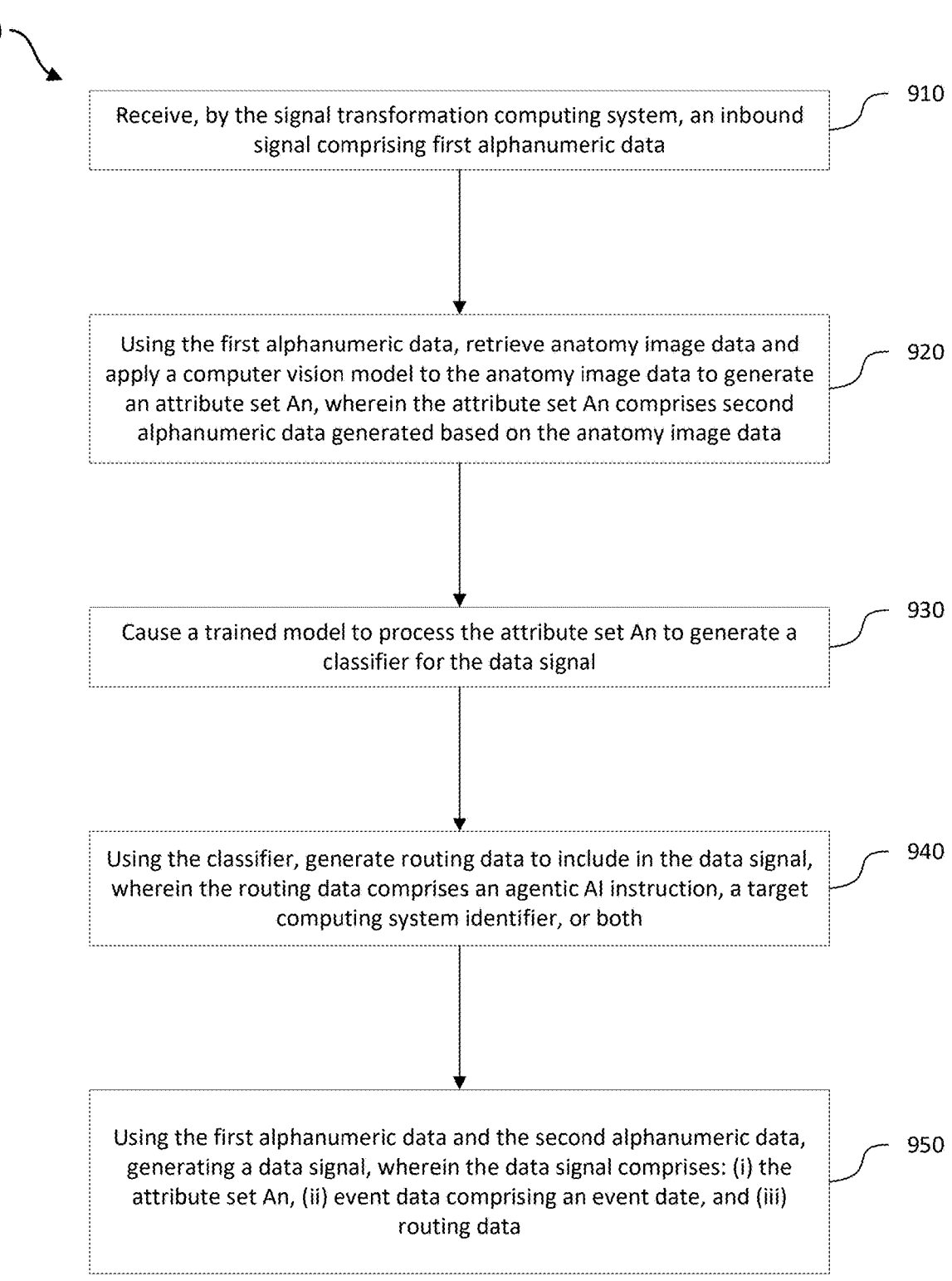

Receive, by the signal transformation computing system, an inbound signal comprising first alphanumeric data — 910

Using the first alphanumeric data, retrieve anatomy image data and apply a computer vision model to the anatomy image data to generate an attribute set An, wherein the attribute set An comprises second alphanumeric data generated based on the anatomy image data — 920

Cause a trained model to process the attribute set An to generate a classifier for the data signal — 930

Using the classifier, generate routing data to include in the data signal, wherein the routing data comprises an agentic AI instruction, a target computing system identifier, or both — 940

Using the first alphanumeric data and the second alphanumeric data, generating a data signal, wherein the data signal comprises: (i) the attribute set An, (ii) event data comprising an event date, and (iii) routing data — 950

FIG. 9

ARTIFICIAL INTELLIGENCE BASED SIGNAL TRANSFORMATION PLATFORM

TECHNICAL FIELD

The present disclosure generally relates to artificial intelligence based signal transformation platforms, such as platforms for transforming alphanumeric and/or multimodal data signals.

BACKGROUND

Alphanumeric signals refer to a type of data signal that consists of a combination of alphabetic characters (letters) and numeric characters (numbers). These signals can be used to represent a wide range of information, including text, codes, or identifiers. An example of an alphanumeric signal is a claim number "CLM12345" that includes both letters ("CLM") and numbers ("12345"). An alphanumeric signal can identify a specific insurance claim. In the context of insurance claims processing, alphanumeric signals can be used to generate liens. A lien is an assertion of the right to recover payments made by an insurance carrier to an insured from a third-party tortfeasor or their insurer and/or from another source, such as the insured individual's secondary policy. A conventional lien generation process can involve analyzing claims data, identifying relevant information, and applying rules-based logic to determine whether a lien should be asserted. Conventionally, alphanumeric signals or portions thereof can be processed using ETL (Extract, Transform, Load) techniques to generate liens. For instance, ETL tools can extract data from various sources, transform it into a standardized format, and load it into a target system for lien generation.

BRIEF DESCRIPTION OF THE DRAWINGS

FIG. 9 is a flowchart illustrating example operations 900 of the signal transformation system 106, according to some arrangements.

Figure 1:
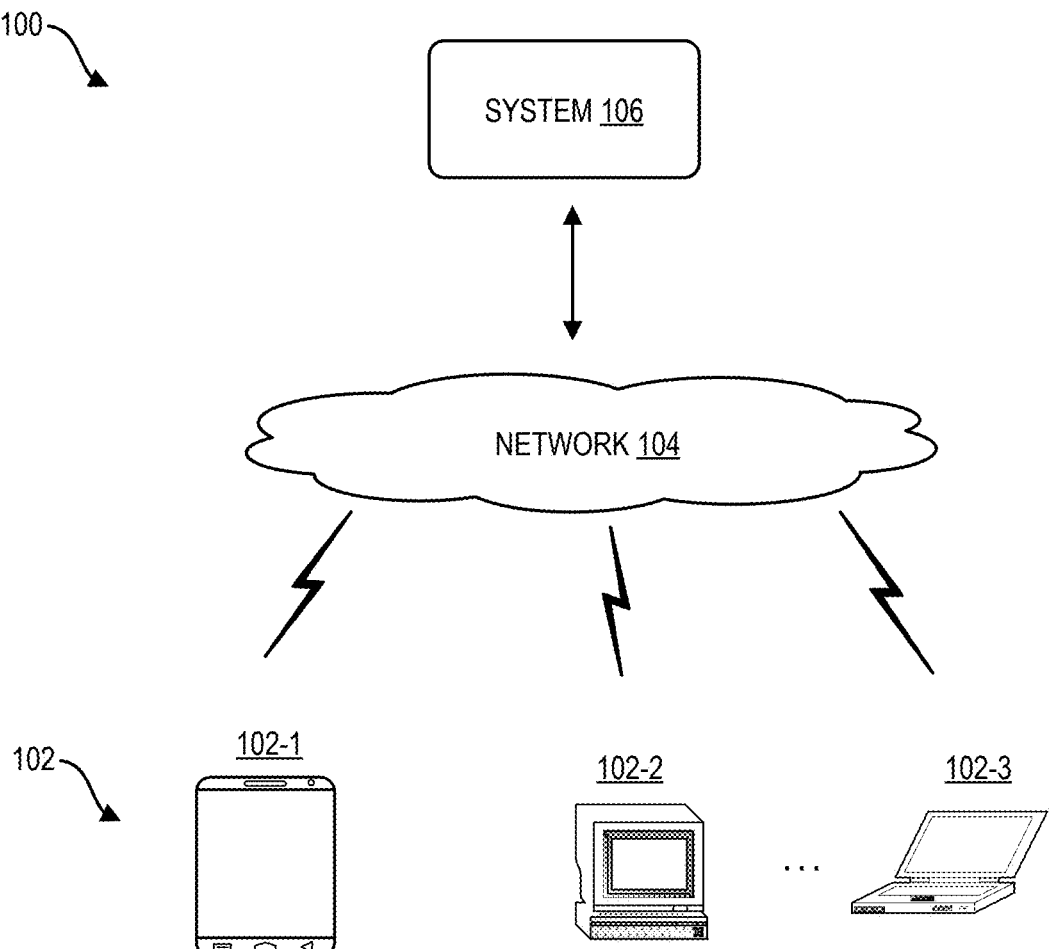
FIG. 1 illustrates an example architecture 100 for implementing a signal transformation system 106, in accordance with some arrangements.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Conventional ETL techniques to generate lien leads based on alphanumeric portions of claims data can result in various inaccuracies, such as false positives. For example, overlapping codes (e.g., diagnostic codes, modifiers, procedure codes) can trigger false positives if the system incorrectly identifies a code as indicative of a lien. Furthermore, insufficient data can lead to false positives if the system makes incorrect assumptions or inferences. For instance, consider a construction worker treated for a rotator cuff injury with a job title of "retired carpenter" and a diagnosis code often associated with overuse injuries. Without additional context, such as a narrative description of the injury indicating it occurred while playing golf or image data showing degenerative changes consistent with age-related wear and tear, a system might incorrectly conclude that the claim is workers' compensation-related due to the job title and diagnosis code alone. Contextual misunderstandings can also occur if the system misinterprets the context of a claim, such as incorrectly assuming a procedure was related to a work injury when it was actually unrelated. Pattern recognition errors can also occur if the system identifies patterns in claims data that are not actually indicative of liens. This can result in downstream system failures, including exceptions in lien processing workflows, incorrect identification of subrogation targets, or routing of claims to incorrect computing systems for resource negotiation, ultimately leading to failed automated recovery processes.

Described herein is an artificial intelligence based signal transformation platform and techniques for processing and transforming multimodal and/or alphanumeric signals. The platform can receive and process alphanumeric and/or multimodal signals by performing signal parsing operations, signal analysis operations, signal transformation operations, and/or signal validation operations. For example, the platform can parse out, from an attribute set of a particular data signal, an event portion (e.g., accident date, injury description), a routing portion (e.g., source system identifiers (URL, hyperlink, IP address, network address, web server)), target system identifiers, commands, API calls, permission information, security information), an attribute portion (e.g., insurer information, claim type, patient demographics, diagnosis codes, procedure codes, anatomy descriptors, alphanumeric or other structured summaries or descriptions of images or videos), and/or a metadata portion (e.g., provider identifiers, timestamps, data format, size, encoding, origin, history, ownership). The platform can perform or enable computer vision operations, such as image segmentation, object detection, and/or image classification, to generate additional attributes based on supplemental image data and/or based on image portions of a multimodal signal. For instance, the platform can analyze medical images, such as X-rays or MRIs, to identify specific features or abnormalities, such as degenerative changes or traumatic injuries. The platform can also perform generative AI operations, such as natural language processing (NLP) operations, to generate text-based attributes from unstructured data, such as medical provider narratives or lab reports.

The platform can utilize various AI/ML techniques, including neural networks and/or deep learning models, to analyze multimodal signals and generate accurate determinations. For example, the platform can use anatomy information from an attribute set to determine whether a particular signal should be routed to a particular target system (e.g., a particular insurer's computing system). The platform can also use pattern recognition techniques to identify claims that are likely to be subject to a lien, based on the attributes and metadata. By combining alphanumeric data with image data and applying AI/ML techniques, the platform can make comparatively more accurate determinations about claims and liens, reducing the risk of false positives and/or false negatives.

The platform's signal transformation operations can include generating and/or determining signal routing values using various parsed and/or generated attributes from a particular data signal. For example, the platform can use the attribute portion to determine the appropriate workflow for claims processing and the relevant downstream target computing systems and/or agentic operations. The platform can also use the metadata portion to track the claim's progress through the processing workflow and ensure that all necessary information is collected and verified.

The platform can cause transformed signals to be sent to target computing systems, such as insurance provider systems. In some implementations, the platform can include one or more AI agents that can perform operations to submit and/or negotiate the subrogation lien requests generated using the input signals. For example, the one or more AI agents can identify parties, generate notifications, evaluate feedback, cause computer-executable logic to be applied to determine if claims have recovery potential, route cases for subject matter expert (SME) review, perform SME review, open cases, close cases, perform recoveries, and the like.

The platform facilitates agentic operations by generating usable and relevant signal elements (e.g., routing information, events, attributes, metadata) and/or liking signals to create signal sets that are usable and relevant to autonomous agents for performing specific tasks. For example, the signals can include path information to enable agents to perform retrieval-augmented generation (RAG) operations for messaging and/or resource negotiation, target system identifier sets to enable agents to invoke correct and allowable downstream operations/other agents, contextual metadata to enable effective messaging and/or resource negotiation, outputs of models that enable negotiation ranges, and/or resource negotiation history.

Signal Transformation System

FIG. 1 illustrates an example architecture 100 for implementing a signal transformation system 106, in accordance with an arrangement of the present disclosure. The system 106 can perform signal ingestion operations, signal parsing operations, signal analysis operations, signal transformation operations, signal validation operations, signal processing operations, and the like. For example, the system 106 can transform alphanumeric and/or multimodal signals to generate outbound signals to target computing systems (e.g., insurer systems), control commands and/or data to operate agentic AI systems (e.g., member outreach agent 314 and/or resource negotiation agent 324 described in connection with FIG. 3), and/or control commands and/or data to operate co-pilot systems.

As illustrated in FIG. 1, one or more user devices (102-1, 102-2 . . . 102-N) can be connected to the signal transformation system 106 through a network 104. A person of ordinary skill in the art will understand that the one or more user devices (102-1, 102-2 . . . 102-N) can be collectively referred as the user devices 102 and individually referred as the user device 102.

In some arrangements, the user device 102 can include, but not be limited to, a mobile, a laptop, etc. Further, the user device 102 can include one or more in-built or externally coupled accessories including, but not limited to, a visual aid device such as a camera, audio aid, microphone, or keyboard. Further, the user device 102 can include a mobile phone, smartphone, virtual reality (VR) devices, augmented reality (AR) devices, a laptop, a general-purpose computer, a desktop, a personal digital assistant, a tablet computer, and a mainframe computer. Additionally, input devices for receiving input from a user such as a touchpad, touch-enabled screen, electronic pen, and the like can be used.

In some arrangements, the network 104 can include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network 104 can also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

The artificial intelligence-based signal transformation system 106 leverages multimodal signals comprising alphanumeric and/or image data to generate accurate determinations about claims and liens. The system 106's signal parsing operations extract relevant information from the signal portions, such as event information, attributes, routing information, and/or metadata. The attribute portion can include anatomy data, such as specific body parts or systems affected by an injury or condition.

The system 106's computer vision operations analyze image data, such as medical images (e.g., X-rays, magnetic resonance images (MRIs)), to generate additional attributes and enrich the signal. For example, neural networks can be applied to identify specific features or abnormalities in the images, such as fractures or soft tissue damage. These features can be linked to anatomy data in the attribute portion, enabling the system 106 to generate more accurate determinations about claims and liens.

An example use case for the system 106 is leveraging machine learning algorithms to identify related claims for the purpose of subrogation. For instance, consider a scenario where a claim data feed contains multiple claims with varying diagnosis codes, service dates, and incident/event numbers. The system 106's AI-powered signal parser can process the claim data feed, applying natural language processing (NLP) techniques to extract relevant information and identify patterns in the data. The system 106's machine learning model can be trained on a dataset of labeled claims, where each claim is associated with a specific outcome (e.g., related or not related). The model can learn to identify complex patterns in the data, such as relationships between diagnosis codes, service dates, and incident/event numbers. For example, the model can identify claims with similar injury patterns, such as whiplash-type trauma, and flag them as related.

The system 106's smart lien generation logic can receive one or more input parameters associated with a messaging and resource negotiation process, including a claim data feed, diagnosis codes, service dates, and incident/event numbers. The claim data feed can contain claims for multiple events/incidents, which can be grouped based on an event number. The system 106's signal parser can process the claim data feed and cause machine learning operations to be performed to identify anatomies associated with each unique event number. The system 106 can include a pre-configured set of anatomies, such as twenty-seven anatomies based on International Classification of Diseases, 10th Revision (ICD-10 codes). Diagnosis codes can be categorized according to these anatomies, and anatomies can be identified for each event number using machine learning-based clustering algorithms. The system 106's rule engine can review the claim data feed, applying predictive modeling techniques to determine the likelihood of a claim being related to a specific event or incident.

The system 106 can share the results with clients, including recommendations for the event/incident, to assist in lien generation. By leveraging the system 106's AI-powered capabilities, insurers and other stakeholders can improve the accuracy and efficiency of claims processing, reducing the risk of downstream system failures and failed automated recovery processes.

In terms of accident type, the system 106 can include neural networks, which can be trained on large datasets of labeled signal data comprising claim attributes and outcomes and can apply pattern recognition techniques to identify claims involving patients with injuries consistent with, for example, slip-and-fall accidents or, more generally, a particular accident type. The models can analyze the signal data to identify complex patterns and relationships between attributes, such as diagnosis codes, service dates, and incident/event numbers. By accurately identifying these patterns, the system 106 can flag and automatically execute on potential subrogation opportunities and improve the efficiency of claims processing.

Figure 2A:
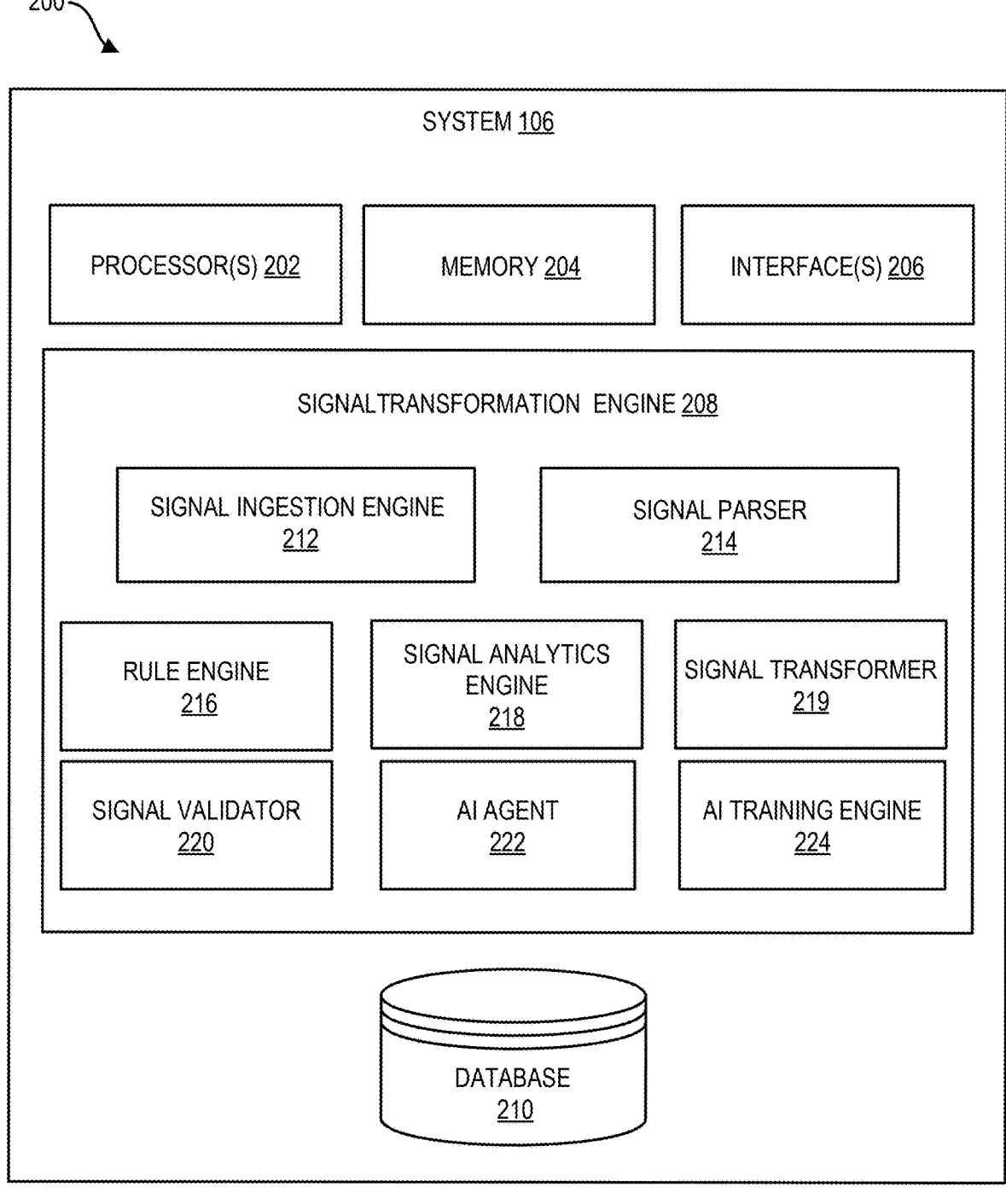
FIG. 2A is an example block diagram 200 of a signal transformation system 106, in accordance with some arrangements.
Figure 2B:
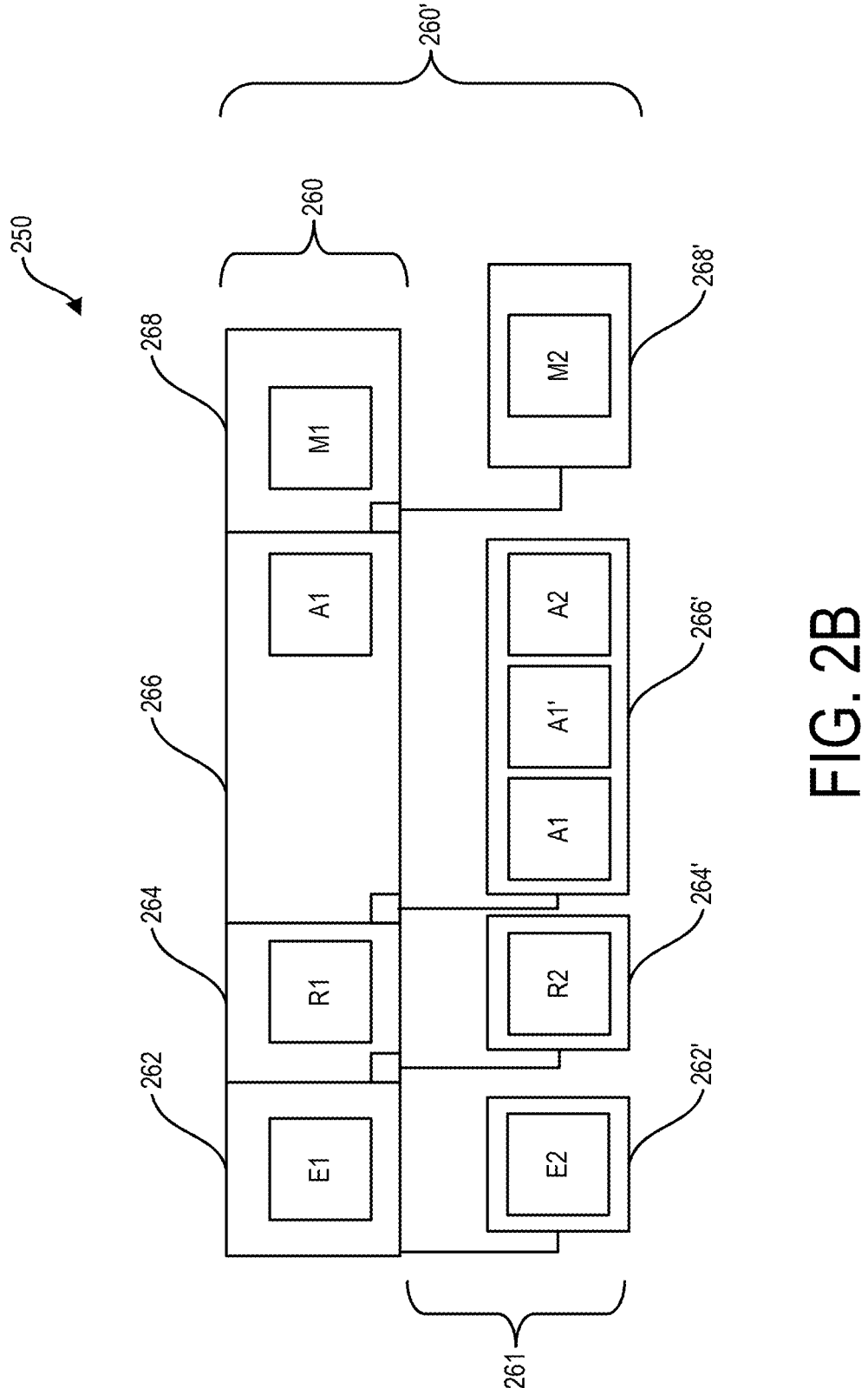
FIG. 2B is an example block diagram representing aspects one or more signals (e.g., linked signals where signal processing and/or linkage can be performed using artificial intelligence), according to some arrangements.

FIG. 2A illustrates an example block diagram 200 of a signal transformation system 106, in accordance with an arrangement of the present disclosure, and FIG. 2B is an example block diagram 250 representing aspects one or more signals (e.g., linked signals 260 and 260' where signal processing and/or linkage can be performed using artificial intelligence). An example signal (260, 261) can include an event portion En (262, 262'), a routing portion En (264, 264'), an attribute portion An (266, 266'), and/or a metadata portion Mn (268, 268'). The system 106 can perform computer-based operations to generate, transform, and/or link signals as described herein.

As shown, in some arrangements, the system 106 can include one or more processor(s) 202. The one or more processor(s) 202 can be implemented as one or more micro-processors, microcomputers, microcontrollers, digital signal processors, central processing units, logic circuitries, and/or any devices that process data based on operational instructions. Among other capabilities, the one or more processor(s) 202 can be configured to fetch and execute computer-readable instructions stored in a memory 204 of the system 106. The memory 204 can be configured to store one or more computer-readable instructions or routines in a non-transitory computer readable storage medium, which can be fetched and executed to create or share data packets over a network service. The memory 204 can comprise any non-transitory storage device including, for example, volatile memory such as random-access memory (RAM), or non-volatile memory such as erasable programmable read only memory (EPROM), flash memory, and the like.

In an example arrangement, the system 106 can include an interface(s) 206. The interface(s) 206 can comprise a variety of interfaces, for example, interfaces for data input and output devices (I/O), storage devices, and the like. The interface(s) 206 can facilitate communication through the system 106. The interface(s) 206 can also provide a communication pathway for one or more components of the system 106. Examples of such components include, but are not limited to, signal transformation engine(s) 208 and a database 210. Further, the signal transformation engine(s) 208 can include a signal ingestion engine 212, a signal parser 214, a rule engine 216, a signal analysis engine 218, a signal signal transformation engine 208, a signal validator 220, an AI agent 222, and/or an AI training engine 224.

In an example arrangement, the signal transformation engine(s) 208 can be implemented as a combination of hardware and programming (for example, programmable instructions) to implement one or more functionalities of the signal transformation engine(s) 208. In examples described herein, such combinations of hardware and programming can be implemented in several different ways. For example, the programming for the signal transformation engine(s) 208 can be processor-executable instructions stored on a non-transitory machine-readable storage medium and the hardware for the signal transformation engine(s) 208 can comprise a processing resource (for example, one or more processors), to execute such instructions. In the present examples, the machine-readable storage medium can store instructions that, when executed by the processing resource, implement the signal transformation engine(s) 208. In such examples, the system can comprise machine-readable storage media storing the instructions and the processing resource to execute the instructions, or the machine-readable storage medium can be separate but accessible to the system and the processing resource. In other examples, the signal transformation engine(s) 208 can be implemented by electronic circuitry.

In an example arrangement, the processor 202 can receive (e.g., via the signal ingestion engine 212) a data signal that can include one or more input parameters associated with a messaging and resource negotiation process, such as a subrogation process, through the signal ingestion engine 212. The one or more input parameters can be received from a user device 102. The processor 202 can store the one or more input parameters in the database 210. The one or more input parameters can include, but not limited to, a claim data feed, a diagnosis code, and a service date with an incident/event number. Further, the one or more input parameters can include a date of injury (DOI) associated with the reported damage. The claim feed can contain claims for multiple events/incidents which can be grouped based on an event number.

In some arrangements, the signal parser 214 can process the signals to parse out various portions of the signals. For example, the signal parser 214 can apply computer vision techniques to image-based portions of the signal to generate textual descriptions of images and perform fusion operations to bind textual representations of the image information to a particular signal (e.g., by modifying the event portion, routing portion, attribute portion, and/or metadata portion of the signal). For example, the signal parser 214 can perform data quantization operations, vectorize attribute data, and/or perform similar operations to optimize the signal for downstream processing. For example, the signal parser 214 can vectorize at least a portion of the event portion, routing portion, attribute portion, and/or metadata portion of the signal to facilitate the downstream processing of the signal by AI models.

In an example use case, the signal parser 214 can process the claim data feed. The signal parser 214 can search for claims with a service start date matching the DOI to identify anatomies (for the reported damage) associated with each unique event number. For example, the processor 202 can receive data and the one or more input parameters associated with the messaging and resource negotiation process. For example, the processor 202 can dynamically adjust the DOI window to control the level of accuracy of a particular model implemented by the processor 202 for the messaging and resource negotiation process.

In some arrangements, the rule engine 216 can process the claim data feed for identifying data signals that correspond to claims claims at a particular event level. For instance, the system 106 can identify potential claims related to the derived claims and flag them as "Related." In an example use case, claims associated with the claim data feed with generic codes, such as Hypertension or Muscle Spasm, can be flagged as "Generic" and all other claims can be flagged as "Not Related." All received claims can be shared back with the client device or requesting system by the processor 202, along with recommendations for the event/incident, to assist in lien generation.

In some arrangements, the signal analysis engine 218 can perform various operations to analyze the signal portions, such as identifying patterns, trends, and correlations. For example, the signal analysis engine 218 can analyze the attribute portion An (266, 266') of a signal to identify claims with similar diagnosis codes or procedure codes, and determine the likelihood of a claim being related to a specific event or incident. For instance, the signal analysis engine 218 can identify a pattern of claims with diagnosis codes related to whiplash-type trauma, and determine that these claims are likely related to a specific car accident. This can enable the system 106 to flag these claims for further review. Additionally, the signal analysis engine 218 can use a computer vision model to analyze pictorial data, such as medical images, and generate anatomy data that describes the injuries depicted in the images. For example, the computer vision model can generate anatomy data that indicates the presence of a fracture in a specific bone, and the signal analysis engine 218 can validate this data against a taxonomy of anatomy codes to ensure accuracy. The signal analysis engine 218 can use an AI model, such as a machine learning model, to identify patterns in the signal data and make predictions about future claims.

In some arrangements, the signal signal transformation engine 208 can perform operations to transform or modify the signal portions. For instance, the signal signal transformation engine 208 can transform the event portion En (262, 262') of a signal to generate a standardized description of an accident, or modify the attribute portion An (266, 266') to generate a new attribute that combines diagnosis codes and procedure codes. For example, the signal signal transformation engine 208 can transform a free-text description of an accident into a standardized format, such as "rear-end collision," and append this to the event portion En (262, 262') of the signal. Additionally, the signal signal transformation engine 208 can use a computer vision model to generate a text description of a medical image, such as "fracture of the femur," and validate this description against a set of predefined codes to ensure accuracy. The signal signal transformation engine 208 can use an AI model, such as a natural language processing model, to generate the text description and ensure that it is accurate and consistent.

In some arrangements, the signal validator 220 can perform operations to validate the signal portions, such as checking for data consistency, accuracy, and completeness. For example, the signal validator 220 can validate the metadata portion Mn (268, 268') of a signal to ensure that the provider identifiers and timestamps are accurate and consistent. For instance, the signal validator 220 can check that the provider identifier in the metadata portion Mn (268, 268') matches the provider identifier in the attribute portion An (266, 266'), and flag any discrepancies for further review. Additionally, the signal validator 220 can validate anatomy data generated from pictorial data against a taxonomy of anatomy codes to ensure that the data is accurate and consistent. The signal validator 220 can use an AI model, such as a machine learning model, to identify patterns in the signal data and detect any anomalies or inconsistencies.

In some arrangements, the signal analysis engine 218 can generate new insights by linking multiple signals, such as linked signals 260 and 260', and analyzing the event portion En (262, 262'), routing portion En (264, 264'), attribute portion An (266, 266'), and/or metadata portion Mn (268, 268') of each signal. This can enable the system 106 to identify complex patterns and relationships between claims. For example, the signal analysis engine 218 can link multiple signals related to a specific accident, and identify a pattern of claims with similar diagnosis codes or procedure codes. Additionally, the signal analysis engine 218 can analyze pictorial data, such as medical images, and identify patterns or trends in the images that are indicative of specific types of injuries. The signal analysis engine 218 can use an AI model, such as a deep learning model, to analyze the pictorial data and identify patterns that are not apparent to human reviewers.

In some arrangements, the signal signal transformation engine 208 can modify the routing portion En (264, 264') of a signal to update the target system identifiers or commands, based on the analysis performed by the signal analysis engine 218. This can enable the system 106 to dynamically route signals to different target systems or applications. For instance, the signal signal transformation engine 208 can update the routing portion En (264, 264') to route signals related to a specific type of claim to a specific target system for further processing. Additionally, the signal signal transformation engine 208 can use a computer vision model to analyze pictorial data and generate a new attribute that describes the contents of the image. The signal signal transformation engine 208 can use an AI model, such as a machine learning model, to determine the optimal routing for the signal based on the analysis performed by the signal analysis engine 218.

In some arrangements, the signal validator 220 can validate the integrity of the signal by checking for inconsistencies or errors in the event portion En (262, 262'), attribute portion An (266, 266'), or metadata portion Mn (268, 268'). This can ensure that the signal is accurate and reliable, and can be used for further processing or analysis. For example, the signal validator 220 can check for inconsistencies between the event portion En (262, 262') and the attribute portion An (266, 266'), such as a mismatch between the accident date and the claim date. Additionally, the signal validator 220 can validate text descriptions generated from pictorial data against a set of pre-defined codes to ensure accuracy and consistency. The signal validator 220 can use an AI model, such as a natural language processing model, to validate the text descriptions and ensure that they are accurate and consistent.

In some implementations, the signal transformation engine 208 can cause the processed signals to be sent to target computing systems.

In some implementations, a target computing system can be an insurance provider system, a claims processor system, a reviewer system, or, more generally, a computing system associated with an entity that asserts the subrogation lien or an entity against which the subrogation lien is asserted. To that end, the platform can include one or more AI agents 222 that can perform operations to submit and/or negotiate the subrogation lien requests generated using the input signals. For example, the one or more AI agents 222 can identify parties, generate notifications, evaluate feedback, cause computer-executable logic to be applied to determine if claims have recovery potential, route cases for subject matter expert (SME) review, perform SME review, open cases, close cases, perform recoveries, and the like.

As used herein, the term "agent" and similar terms (e.g., "co-pilot", "logic") refer to entities that interact with their environment, process information, and/or take actions to achieve specific goals or objectives. An agent can be thought of as a software, firmware and/or hardware component that encompasses characteristics (e.g., traits, attributes, properties, and/or knowledge), states (e.g., user question or its derivatives, agent feedback), and/or agent interaction rules that govern its behavior and communication with other agents. The agent definitions can include references (e.g., programmatic bindings, function calls, local copies of) to AI models that define agents' decision-making processes and behaviors. Instantiating (spawning) an agent refers to the process of creating a new instance of an agent entity, class or object, which can involve allocating memory for the agent's data structures and variables, initializing agent attributes, setting up agent communication channels, and activating agent reasoning and decision-making mechanisms. This process can be compared to creating a new thread or process in a computer program, where the instantiated agent operates as a separate entity, executing autonomously and interacting with its environment and other agents. Depending on the implementation, agents can take various forms, such as executables running on physical and/or virtual machines and/or robotic agents interacting with physical environments. In some cases, agents can be instantiated as containerized applications, leveraging technologies like Docker, or as serverless functions, utilizing platforms like AWS Lambda. Additionally, agents can be implemented using various programming paradigms, including object-oriented, functional, or logic-based programming, and can be designed to operate in diverse domains, such as e-commerce, healthcare, finance, or transportation.

Agents can use physical or virtualized resources (e.g., processors, memory, cache, communication interfaces, devices, databases, servers, components of the AI stack) in any suitable combination. Particular ones of such resources can be statically allocated or dynamically allocated at runtime (e.g., to a particular agent or group of agents for a duration of a simulation session or a set of simulation sessions). Particular ones of such resources can be dedicated, shared among agents, or shared between an agent and other processes. Various components of agents (e.g., models, data stores, executables) can be implemented across resources in a distributed manner. Accordingly, unless otherwise indicated by context or expressly noted, the terms "local" (as in "local agent") and "node" (as in "agent node") should not be automatically assumed to refer to a particular unitary physical resource.

In some implementations, an AI agent can interact with an insurance company system to submit and negotiate resource requests (e.g., subrogation lien requests). For example, the agent can route or transmit an electronic message, such as a JSON-formatted request, to the insurance company system, including the signal elements, such as the event portion En (262, 262'), attribute portion An (266, 266'), and metadata portion Mn (268, 268'). The agent can use the signal elements to determine the optimal resource negotiation strategy, such as the amount of the lien to request or the settlement terms to propose. Accordingly, at least a portion of the signal can be structured in a manner that facilitates autonomous operation of the agent and improves the range of agent capabilities. For example, certain portions of the signal (e.g., routing portion, metadata portion) can be modified to include data items that facilitate programmatic access to computing resources, resource-augmented generation retrieval points, data points for applying computer-based negotiation strategies, and the like.

As part of this process, the agent can invoke a resource negotiation agent to negotiate the subrogation lien using the data signal generated by the signal transformation engine 208. The resource negotiation agent can use machine learning models to analyze the signal elements and determine the best resource negotiation tactics. For instance, the resource negotiation agent can use the attribute portion An (266, 266') to determine the severity of the injury and the likelihood of a successful recovery, and adjust the resource negotiation strategy accordingly. The resource negotiation agent can use mathematical formulas, such as examples below, to determine the optimal resource negotiation strategy.

Let L be the lien amount, S be the settlement amount, and P be the probability of a successful recovery. Then, L be used to determine the expected value of the lien:

$$E(L) = P * S \tag{1}$$

The resource negotiation agent can also use game theory to determine the optimal resource negotiation strategy. For example, the resource negotiation agent can use a formula, such as the Nash bargaining solution, to determine the optimal settlement amount:

$$S^* = \text{Argmax}(S - d1)^\wedge \alpha * (S - d2)^\wedge \beta, \tag{2}$$

where d1 and d2 are the disagreement points for the two parties, and α and β are the bargaining powers. The signal elements can be used to estimate the disagreement points, d1 and d2. For instance, d1 can be estimated as the expected value of the lien, E(L), based on the attribute portion An (266, 266'), while d2 can be estimated as the insurance company's reserve amount, which can be inferred from the metadata portion Mn (268, 268'). The bargaining powers, α and β, can be estimated based on the resource negotiation history and the signal elements. By plugging these values into the Nash bargaining solution, the resource negotiation agent can determine the optimal settlement amount, S*. By using the signal elements in this manner, the resource negotiation agent can optimize the resource negotiation strategy and achieve a better outcome for the subrogation lien.

Example Signal Transformation Operations

Figure 3:
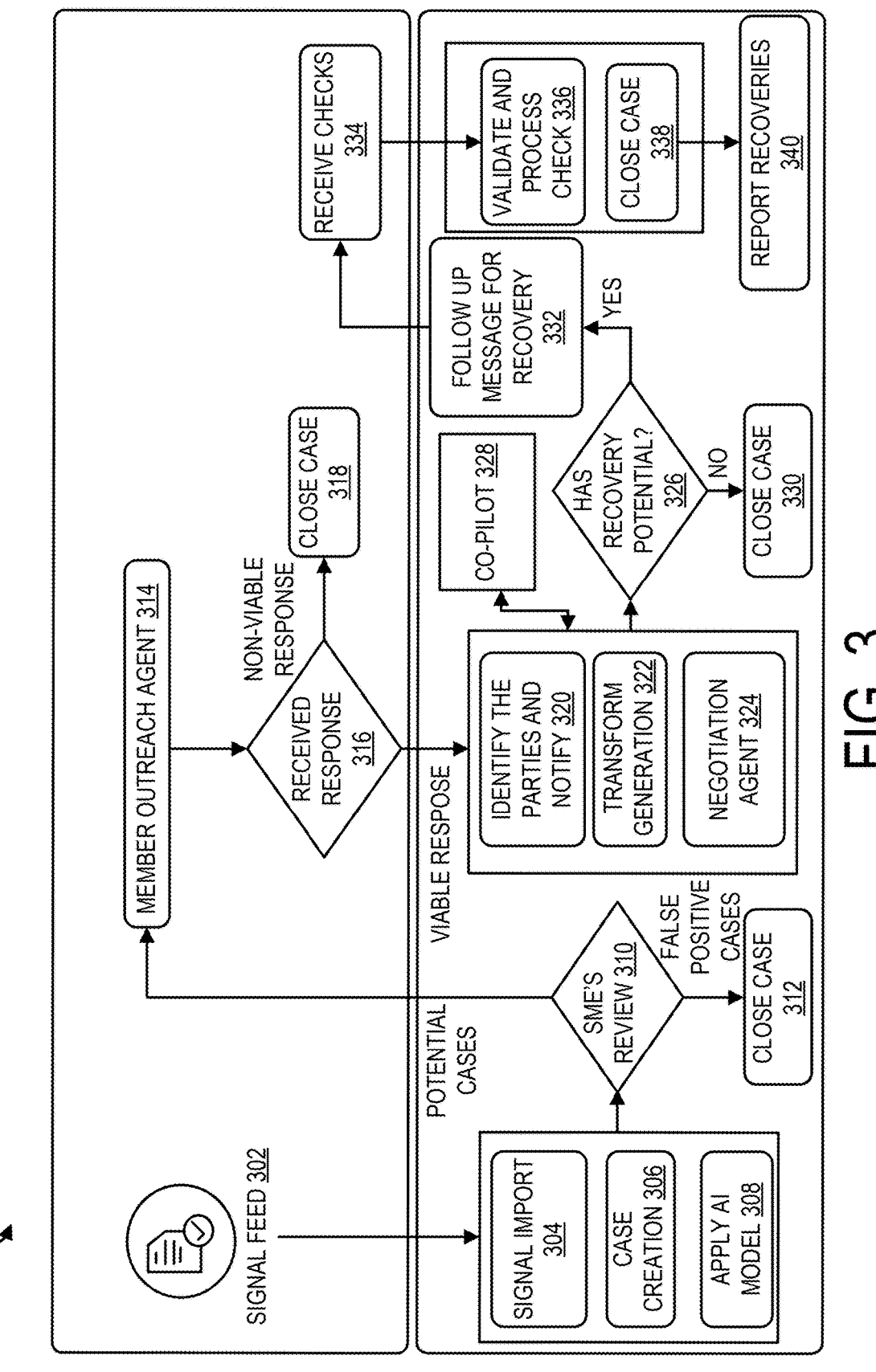
FIG. 3 illustrates an example flow diagram 300 of a messaging and resource negotiation process implemented by the signal transformation system 106, in accordance with some arrangements.

FIG. 3 illustrates an example flow diagram 300 of a messaging and resource negotiation process implemented by the signal transformation system 106, in accordance with an arrangement of the present disclosure.

At 302, the system 106 can receive a claim data feed, which can include signal data that requires analysis and processing. This signal data can include an event portion En (262, 262'), a routing portion En (264, 264'), an attribute portion An (266, 266'), and/or a metadata portion Mn (268, 268'). The system 106 can use the signal ingestion engine 212 to receive the claim data feed and store the one or more input parameters in the database 210.

At 304, the system 106 can import data associated with the claim data feed, and perform signal analysis operations to identify patterns, trends, and correlations in the signal data. The signal parser 214 can process the signals to parse out, modify, update, augment, or generate various portions of the signals, such as the event portion En (262, 262'), attribute portion An (266, 266'), and metadata portion Mn (268, 268'). The signal parser 214 can apply computer vision techniques to image-based portions of the signal to generate textual descriptions of images and perform fusion operations to bind textual representation of the image information to a particular signal.

At 306, the system 106 can create a case associated with the data for subrogation potential claims or members, using signal transformation operations to generate new attributes and features that can help identify high-value cases. The signal signal transformation engine 208 can perform operations to transform or modify the signal portions, such as transforming the event portion En (262, 262') of a signal to generate a standardized description of an accident, or modifying the attribute portion An (266, 266') to generate a new attribute that combines diagnosis codes and procedure codes.

At 308, the system 106 can apply a trained specialist model (e.g., a third-party liability (TPL) model) for cases created, using machine learning models to analyze the signal data and determine the likelihood of a successful recovery. The signal analysis engine 218 can perform various AI operations to analyze the signal portions, such as identifying patterns, trends, and correlations. For example, the signal analysis engine 218 can analyze the attribute portion An (266, 266') of a signal to identify claims with similar diagnosis codes or procedure codes, and determine the likelihood of a claim being related to a specific event or incident. For example, the signal analysis engine 218 can utilize anatomy attributes to cluster data and determine whether the clustered signal data is likely correlated to a particular accident type. The signal analysis engine 218 can validate computer-generated anatomy data against a taxonomy of anatomy codes (e.g., using RAG or another similar technique) to ensure accuracy.

At 310, the system 106 can route or transmit the case for review, where a subject matter expert (SME) can evaluate the signal data and recommend outreach to members with high subrogation potential. The system 106 can use signal validation operations to ensure that the signal data is accurate and reliable, and that the SME has access to all relevant information. The signal validator 220 can perform operations to validate the signal portions, such as checking for data consistency, accuracy, and completeness.

At 312, in response to a negative review from the SME, the system 106 can close the case and record the response as non-viable. At 314, in response to a positive determination from the SME, the system 106 can invoke an agent to automatically perform member outreach, and use agent-based operations to automate the outreach process and negotiate with the member. The AI agent 222 can interact with an insurance company system (e.g., by displaying data, invoking an autonomous or semi-autonomous agent) to submit and negotiate subrogation lien requests, using the signal elements to determine the optimal resource negotiation strategy.

At 316, the system 106 can determine a response based on the outreached case, using signal analysis operations to evaluate the member's response and determine the likelihood of a successful recovery. The resource negotiation agent can use machine learning models to analyze the signal elements and determine the best resource negotiation tactics. For instance, the resource negotiation agent can use the attribute portion An (266, 266') to determine the severity of the injury and the likelihood of a successful recovery, and adjust the resource negotiation strategy accordingly.

At 322, the system agent can enable lien generation based on inputs from the parties, using signal transformation operations to generate a lien document that includes all relevant information. At 324, the system 106 can negotiate (e.g., by displaying data, invoking an autonomous or semi-autonomous agent) based on the generated lien, using agent-based operations to automate the negotiation process and reach a settlement.

At 326, the system 106 can determine if the generated lien possesses recovery potential, using signal analysis operations to evaluate the likelihood of a successful recovery. The signal analysis engine 218 can generate new insights by linking multiple signals, such as linked signals 260 and 260', and analyzing the event portion En (262, 262'), routing portion En (264, 264'), attribute portion An (266, 266'), and/or metadata portion Mn (268, 268') of each signal.

At 328, the system 106 can route or transmit the generated lien to a smart lien co-pilot platform for processing, and use signal validation operations to ensure that the lien is accurate and complete. At 330, in response to a negative determination, the system 106 can close the case and record the response as non-viable. At 332, in response to a positive determination, the system 106 can follow up with the attorney for recovery based on the recovery potential of the case.

At 334, the system 106 can receive checks based on the recovery potential of the lien, and use signal validation operations to ensure that the payment is accurate and complete. At 336, the system 106 can validate and process the check, and use signal transformation operations to update the case records and reflect the payment. At 338, the system 106 can close the case once the check is processed, and at 340, the system 106 can report recoveries to the client upon completion of the check processing.

Figure 4:
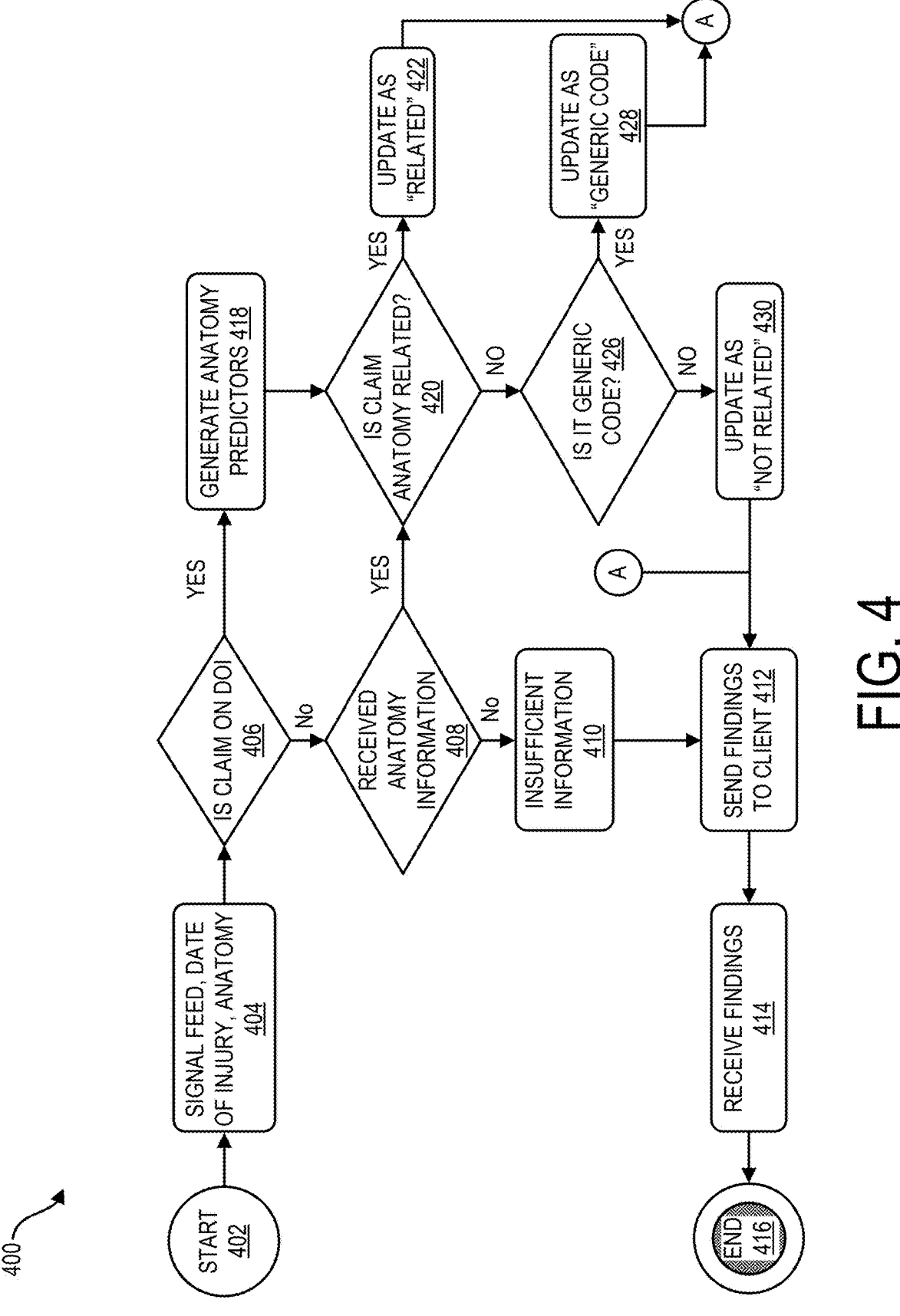
FIG. 4 illustrates an example flow diagram 400 of an application programming interface (API) implemented by the signal transformation system 106, in accordance with some arrangements.

FIG. 4 illustrates an example flow diagram (400) of an application programming interface (API) implemented by the signal transformation system 106, in accordance with an arrangement of the present disclosure.

At 402, the system 106 can initiate a messaging and resource negotiation process through the API, which can involve signal transformation operations to generate new attributes and features that can help identify high-value cases. The signal ingestion engine 212 can receive the claim data feed and store the one or more input parameters in the database 210.

At 404, the system 106 can receive data and generate the claim feed data through the API, which can include signal data that requires analysis and processing. The signal parser 214 can process the signals to parse out various portions of the signals, such as the event portion En (262, 262'), attribute portion An (266, 266'), and metadata portion Mn (268, 268').

At 406, the system 106 can determine if the claim is on the date of injury (DOI) based on the received data, using signal analysis operations to identify patterns, trends, and correlations in the signal data. The signal analysis engine 218 can analyze the attribute portion An (266, 266') of a signal to identify claims with similar diagnosis codes and/or procedure codes, and determine the likelihood of a claim being related to a specific event or incident.

At 408, based on a negative determination from 406, the system 106 can determine if claim information is received, and check if the signal data is accurate and complete. The signal validator 220 can perform operations to validate the signal portions, such as checking for data consistency, accuracy, and completeness.

At 410, in response to a negative determination from 408, the system 106 can determine insufficient data associated with the claim and use signal transformation operations to generate new attributes and features that can help identify high-value cases. The signal signal transformation engine 208 can perform operations to transform or modify the signal portions, such as transforming the event portion En (262, 262') of a signal to generate a standardized description of an accident.

At 412, the system 106 can route or transmit the findings to the API based on findings associated with the insufficient data, and use signal validation operations to ensure that the signal data is accurate and reliable. At 414, the API can receive the findings associated with the insufficient data, and at 416, the system 106 can terminate the messaging and resource negotiation process.

At 418, in response to a positive determination from 406, the system 106 can identify anatomies associated with the claim, using signal analysis operations to identify patterns, trends, and correlations in the signal data. In some implementations, the system can cross-reference data to identify anatomies. In some implementations, the system can use text descriptions of image data to identify anatomies. The signal analysis engine 218 can also analyze the attribute portion An (266, 266') of a signal to identify claims with similar diagnosis codes or procedure codes.

At 420, the system 106 can determine if the anatomies associated with an injury are related to the claim, using signal validation operations to ensure that the signal data is accurate and reliable. At 422, in response to a positive determination from 420, the system 106 can flag the claim as related code and go to 412. At 424, the system 106 can determine if the claim is generic, and use signal transformation operations to generate new attributes and features that can help identify high-value cases. At 426, in response to a positive determination from 424, the system 106 can flag the claim as a generic code and go to 412. At 430, in response to a negative determination from 424, the system 106 can update the claim as "not related" and go to s 412, 414, and 416 accordingly, using signal validation operations to ensure that the signal data is accurate and reliable.

Figure 5:
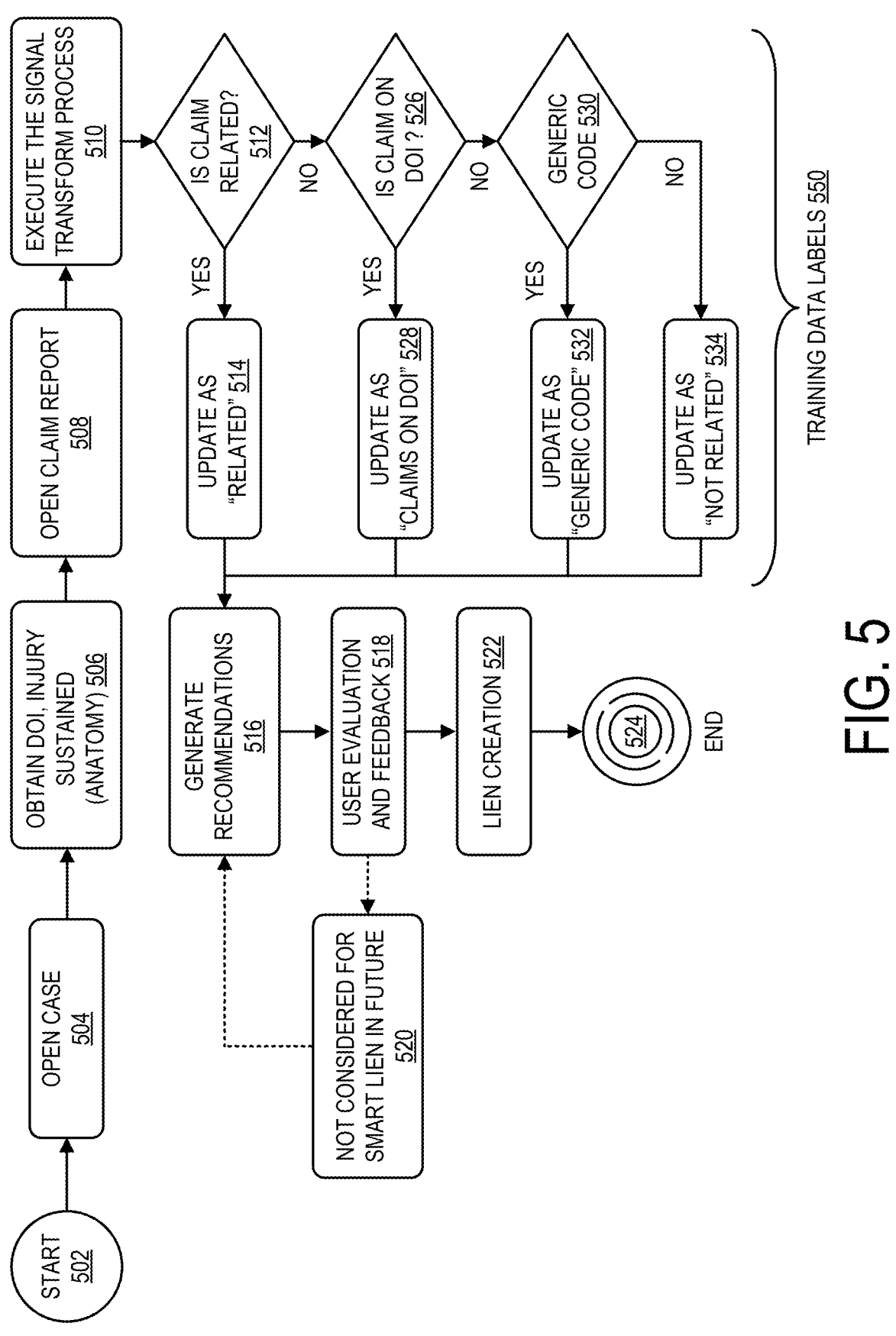
FIG. 5 illustrates an example training process 500 for artificial intelligence models of the signal transformation system 106, in accordance with some arrangements.

FIG. 5 illustrates an example process 500 implemented by the signal transformation system 106, in accordance with an arrangement.

At 502, the system 106 can initiate the process, which can involve signal transformation operations to generate new attributes and features that can help identify high-value cases. The signal ingestion engine 212 can receive the claim data feed and store the one or more input parameters in the database 210.

At 504, the system 106 can open a case associated with the date of injury (DOI) and the injury sustained by a user, and use signal analysis operations to identify patterns, trends, and correlations in the signal data. The signal analysis engine 218 can analyze the attribute portion An (266, 266') of a signal to identify claims with similar diagnosis codes or procedure codes.

At 506, the system 106 can process the case to obtain the DOI and information associated with the injury, using signal validation operations to ensure that the signal data is accurate and reliable. The signal validator 220 can perform operations to validate the signal portions, such as checking for data consistency, accuracy, and completeness.

At 508, the system 106 can open a claim report based on the case, and use signal transformation operations to generate new attributes and features that can help identify high-value cases. The signal signal transformation engine 208 can perform operations to transform or modify the signal portions, such as transforming the event portion En (262, 262') of a signal to generate a standardized description of an accident.

At 510, the system 106 can execute a messaging and resource negotiation process via the rule engine 216, which can involve applying rules and logic to determine the likelihood of a successful recovery. The rule engine 216 can review the claim data feed for determining the claims at a particular event level.

At 512, the system 106 can determine if the claim is related to a third-party liability in payment services, using signal analysis operations to identify patterns, trends, and correlations in the signal data. At 514, based on a positive determination from 512, the system 106 can update the information as related, and use signal transformation operations to generate new attributes and features that can help identify high-value cases.

At 516, the system 106 can generate recommendations associated with the claims, using signal analysis operations to identify patterns, trends, and correlations in the signal data. The signal analysis engine 218 can analyze the attribute portion An (266, 266') of a signal to identify claims with similar diagnosis codes or procedure codes.

At 518, the system 106 can enable evaluation by the user and receive feedback from the user based on the generated claims, using signal validation operations to ensure that the signal data is accurate and reliable. At 520, the system 106 can record the feedback from the user and go to 516 to update the recommendations associated with the updated claim.

At 522, the system 106 can enable lien creation based on the updated claim, using signal transformation operations to generate new attributes and features that can help identify high-value cases. At 524, the system 106 can terminate the process.

At 526, based on a negative determination from 512, the system 106 can further determine if the claim is associated with the DOI, using signal analysis operations to identify patterns, trends, and correlations in the signal data. At 528, based on a positive determination from 526, the system 106 can update the claims as the claims associated with the DOI and execute s 514 to 524.

At 530, based on a negative determination from 526, the system 106 can further determine if the information is associated with a generic code, using signal validation operations to ensure that the signal data is accurate and reliable. At 532, based on a positive determination from 530, the system 106 can update the information as the generic code and execute s 514 to 524.

At 534, based on a negative determination from 530, the system 106 can update the information as unrelated and execute s 514 to 524, using signal transformation operations to generate new attributes and features that can help identify high-value cases.

In some implementations, to enable incremental training of signal analysis models, the signal analysis engine 218 can invoke the AI training engine 224. The AI training engine 224 can use the output of decisionals (512, 526, 530) as a classifier that can be used to designate certain signals for inclusion in a training, validation, and/or reference data set (e.g., the classifier data can include a derivative such as a category label, processing designation, agentic instruction or a portion thereof, and/or target system designation). For example, a signal set 260' can be generated. For example, a signal set 260' can include a set of native and/or synthetic signals 260, 261 that can comprise a signal corpus used to train the AI models used by the system 106 and can include the output of decisionals (512, 526, 530) as labels for training or incrementally retraining the models of the platform (e.g., the signal analysis models).

Figure 6:
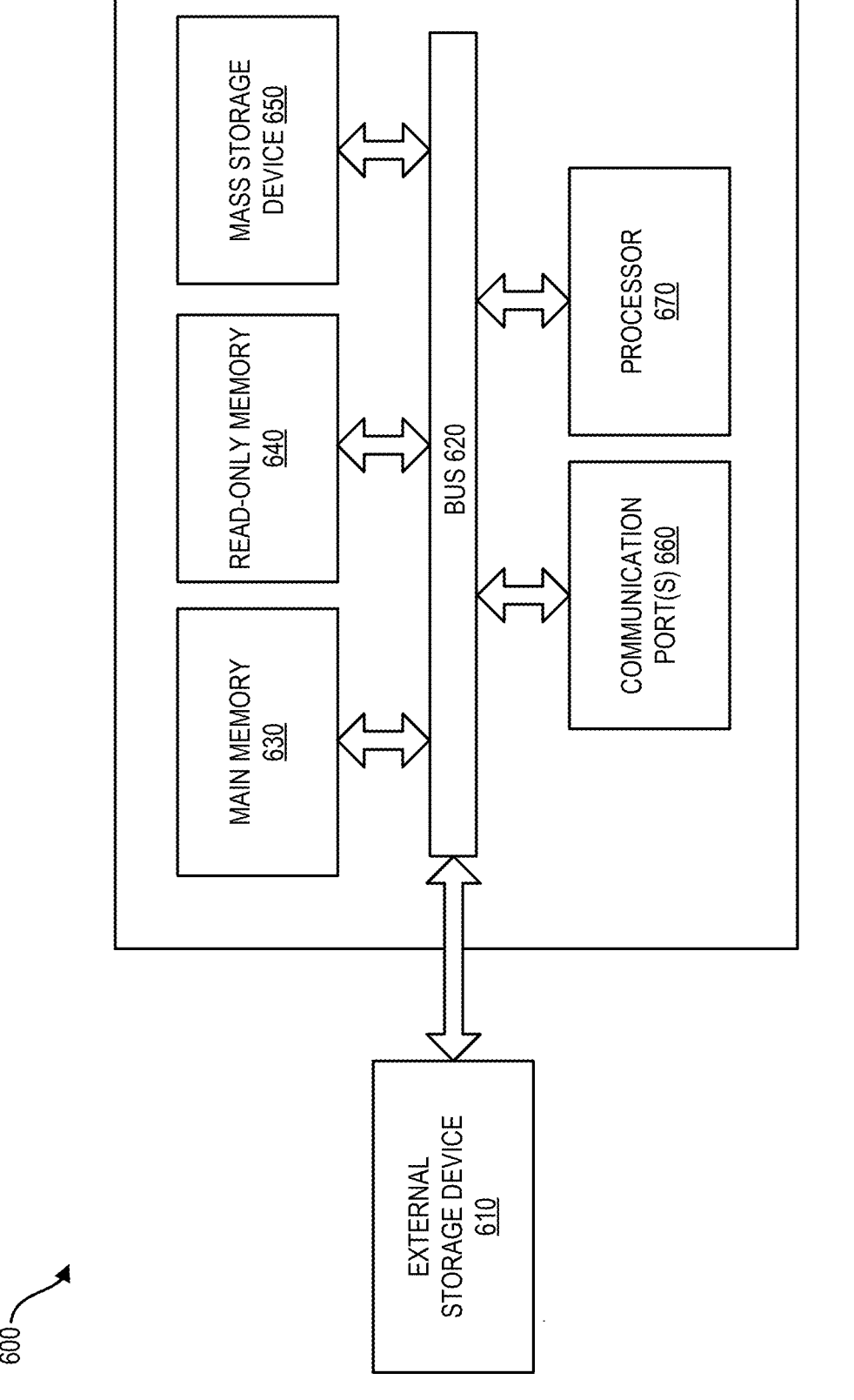
FIG. 6 illustrates an example computer system 600 in which or with which the arrangements of the present disclosure can be implemented.

FIG. 6 illustrates an example computer system 600 in which or with which the arrangements of the present disclosure can be implemented.

As shown in FIG. 6, the computer system 600 can include an external storage device 610, a bus 620, a main memory 630, a read-only memory 640, a mass storage device 650, a communication port(s) 660, and a processor 670. A person skilled in the art will appreciate that the computer system 600 can include more than one processor and communication ports. The processor 670 can include various modules associated with arrangements of the present disclosure. The communication port(s) 660 can be any of an RS-232 port for use with a modem-based dialup connection, a 10/100 Ethernet port, a Gigabit or 10 Gigabit port using copper or fiber, a serial port, a parallel port, or other existing or future ports. The communication ports(s) 660 can be chosen depending on a network, such as a Local Area Network (LAN), Wide Area Network (WAN), or any network to which the computer system 600 connects.

In some arrangements, the main memory 630 can be Random Access Memory (RAM), or any other dynamic storage device commonly known in the art. The read-only memory 640 can be any static storage device(s), e.g., but not limited to, a Programmable Read Only Memory (PROM) chip for storing static information, e.g., start-up or basic input/output system (BIOS) instructions for the processor 670. The mass storage device 650 can be any current or future mass storage solution, which can be used to store information and/or instructions. Example mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In some arrangements, the bus 620 can communicatively couple the processor(s) 670 with the other memory, storage, and communication blocks. The bus 620 can be, e.g., a Peripheral Component Interconnect (PCI)/PCI Extended (PCI-X) bus, Small Computer System Interface (SCSI), Universal Serial Bus (USB), or the like, for connecting expansion cards, drives, and other subsystems as well as other buses, such as a front side bus (FSB), which connects the processor 670 to the computer system 600.

In another arrangement, operator and administrative interfaces, e.g., a display, keyboard, and cursor control device can also be coupled to the bus 620 to support direct operator interaction with the computer system 600. Other operator and administrative interfaces can be provided through network connections connected through the communication port(s) 660. Components described above are meant only to exemplify various possibilities. In no way should the aforementioned example computer system 600 limit the scope of the present disclosure.

Example Computing Environments

Figure 7:
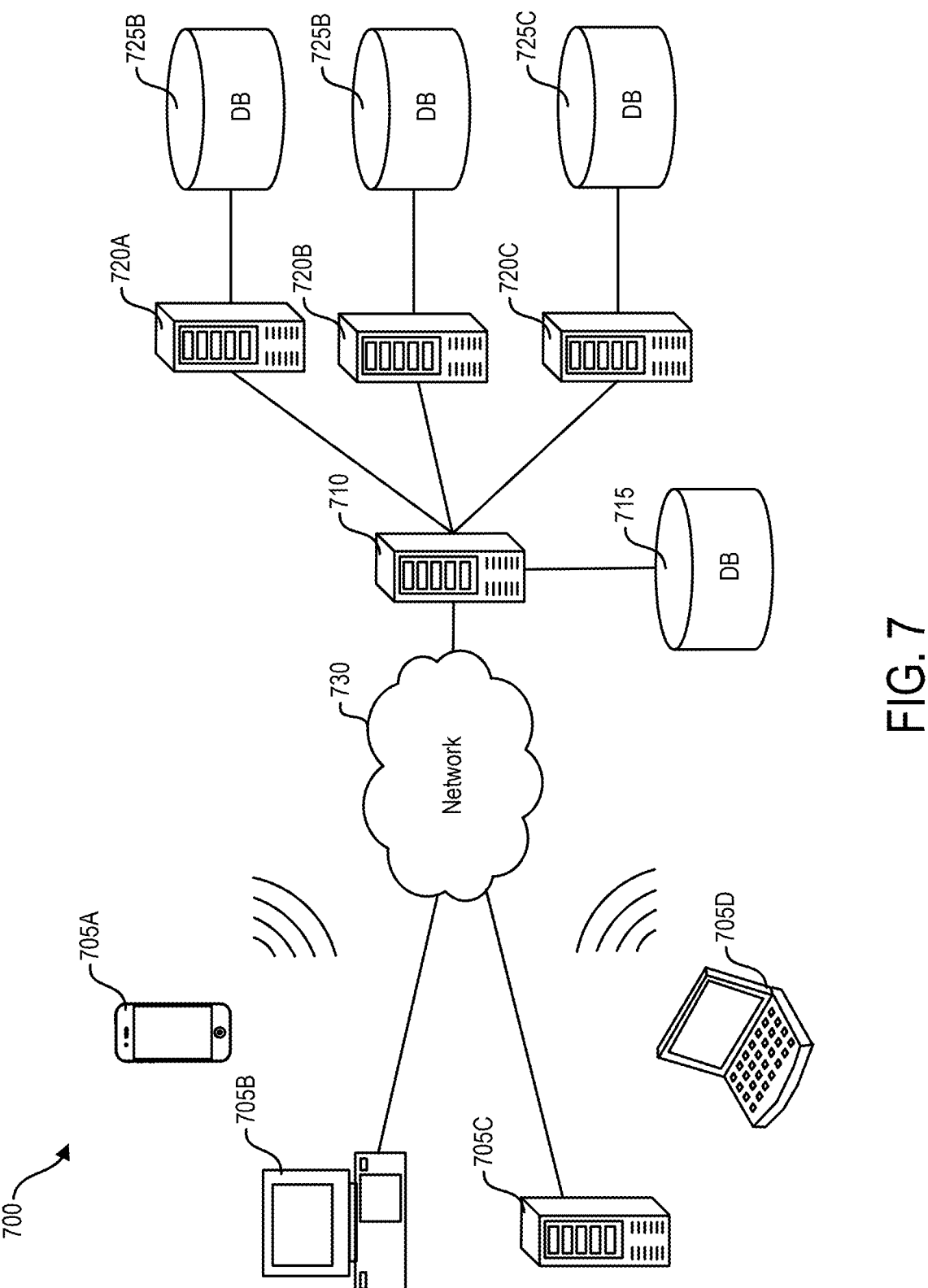
FIG. 7 is a system diagram illustrating an example of a computing environment in which the signal transformation system 106 operates in some implementations of the present technology.

FIG. 7 is a system diagram illustrating an example of a computing environment in which the signal transformation system 106 operates in some implementations of the present technology. In some implementations, environment 700 includes one or more client computing devices 705A-D. Client computing devices 705 operate in a networked environment using logical connections through network 730 to one or more remote computers, such as a server computing device.

In some implementations, server 710 is an edge server which receives client requests and coordinates fulfillment of those requests through other servers, such as servers 720A-C. In some implementations, server computing devices 710 and 720 comprise computing systems. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server 720 can correspond to a group of servers, and each of these servers can share a database or can have its own database. Databases 715 and 725 warehouse (e.g., store) information such as inputs, libraries, configuration data, agent outputs, extracted data and so forth. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

Example AI/ML Stack

Figure 8:
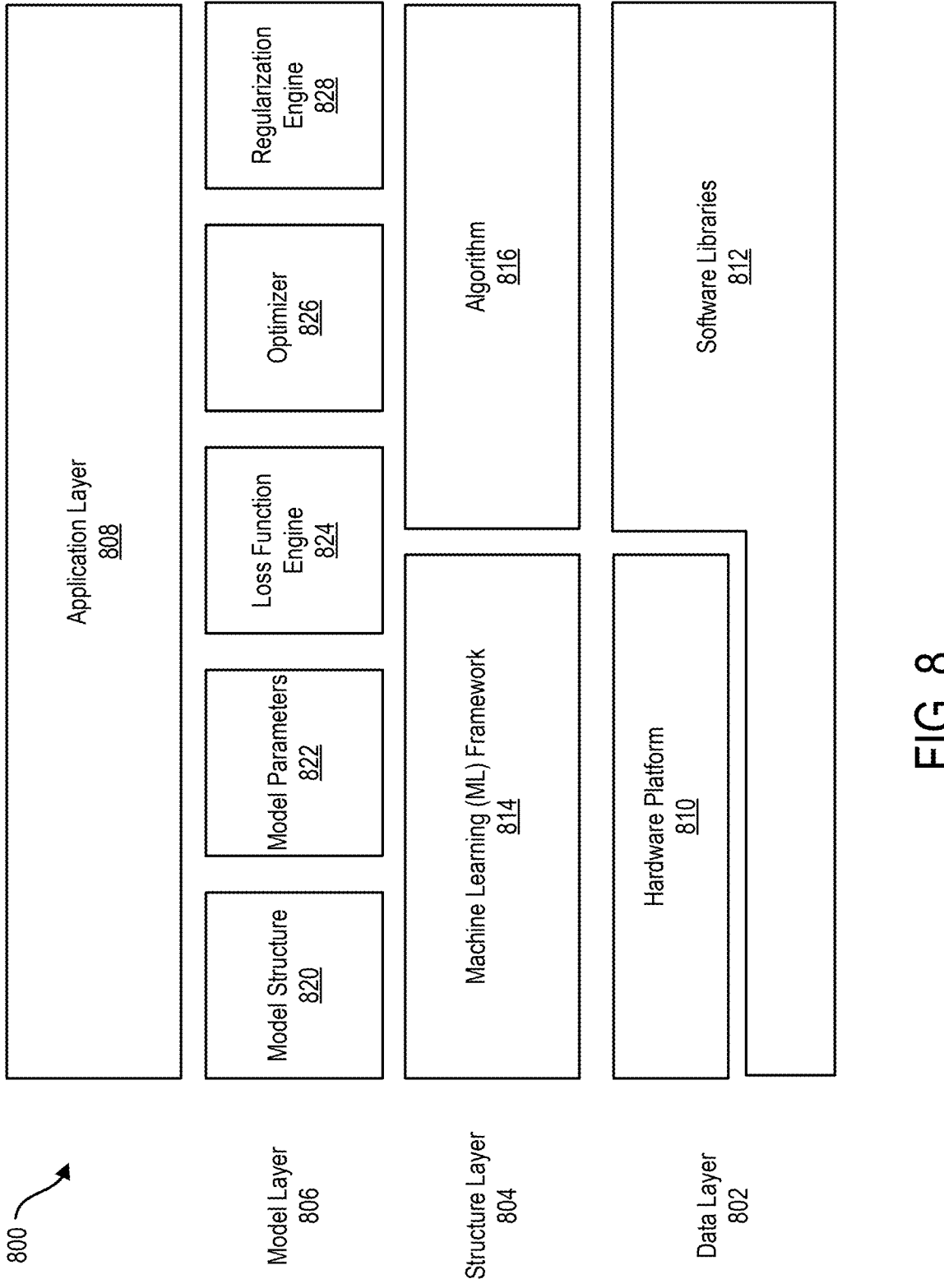
FIG. 8 is a block diagram illustrating an example artificial intelligence/machine learning (AI/ML) stack of the signal transformation system 106, according to some arrangements.

FIG. 8 is a block diagram illustrating an example AI/ML stack of the signal transformation system 106, according to some arrangements. According to various implementations, the AI/ML stack can include AI/ML models, such as computer vision models, classification models, large agent models, small agent models, or additional AI/ML models.

As shown, the AI stack can include a set of layers, which conceptually organize elements within an example network topology for the AI system's architecture to implement a particular AI model. Generally, an AI model is a computer-executable program implemented by the AI stack that analyzes data to make predictions. Information can pass through each layer of the AI stack to generate outputs for the AI model. The layers can include a data layer 802, a structure layer 804, a model layer 806, and an application layer 808. The algorithm 816 of the structure layer 804 and the model structure 820 and model parameters 822 of the model layer 806 together form an example AI model. The optimizer 826, loss function engine 824, and regularization engine 828 work to refine and optimize the AI model, and the data layer 802 provides resources and support for application of the AI model by the application layer 808. The application layer 808 can include, in whole or in part, executables included in an application that enables users to access and interact with the platform (such as, for example, user interfaces).

The data layer 802 acts as the foundation of the AI stack by preparing data for the AI model. As shown, the data layer 802 can include two sub-layers: a hardware platform 810 and one or more software libraries 812. The hardware platform 810 can perform operations for the AI model and include computing resources for storage, memory, logic and networking. The hardware platform 810 can perform back-end operations such as matrix calculations, parallel calculations, machine learning (ML) training, and the like. Examples of components used by the hardware platform 810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 810 can include Infrastructure as a Service (IaaS) resources, which are computing resources (e.g., servers, memory, etc.) offered by a cloud services provider. The hardware platform 810 can also include computer memory for storing data about the AI model, application of the AI model, and training data for the AI model. The computer memory can be a form of random-access memory (RAM), such as dynamic RAM, static RAM, and non-volatile RAM.

The software libraries 812 can be thought of as suites of data and programming code, including executables, used to control the computing resources of the hardware platform 810. The programming code can include low-level primitives (e.g., fundamental language elements) that form the foundation of one or more low-level programming languages, such that the hardware platform 810 can use the low-level primitives to carry out specific operations. The low-level programming languages do not require much, if any, abstraction from a computing resource's instruction set architecture, allowing them to run quickly with a small memory footprint. Examples of software libraries 812 that can be included in the AI stack include Intel Math Kernel Library, Nvidia cuDNN, Eigen, and Open BLAS.

The structure layer 804 can include an ML framework 814 and one or more of an algorithm 816. The ML framework 814 can be thought of as an interface, library, or tool that allows users to build and deploy the AI model. The ML framework 814 can include an open-source library, an application programming interface (API), a gradient-boosting library, an ensemble method, and/or a deep learning toolkit that can work with the layers of the AI system facilitate development of the AI model. For example, the ML framework 814 can be invoked to distribute processes for application or training of the AI model across multiple resources in the hardware platform 810. The ML framework 814 can also include a set of pre-built components that have the functionality to implement and train the AI model and allow users to use pre-built functions and classes to construct and train the AI model. Thus, the ML framework 814 can be used to facilitate data engineering, development, hyperparameter tuning, testing, and training for the AI model. Examples of ML frameworks 814 that can be used in the AI stack include TensorFlow, PyTorch, Scikit-Learn, Keras, Caffe, LightGBM, Random Forest, and Amazon Web Services.

The algorithm 816 can be an organized set of computer-executable operations used to generate output data from a set of input data and can sometimes be described using pseudo-code. The algorithm 816 can include complex code that allows the computing resources to learn from new input data and create new/modified outputs based on what was learned.

The algorithm 816 can build the AI model through being trained (e.g., via a model training engine, which can include a user interface having controls sufficient to enable a user to interact with the model, label data, and so forth) while running computing resources of the hardware platform 810. This training allows the algorithm 816 to make predictions or decisions without being explicitly programmed to do so. Once trained, the algorithm 816 can run at the computing resources as part of the AI model to make predictions or decisions, improve computing resource performance, or perform tasks. The algorithm 816 can be trained using supervised learning, unsupervised learning, semi-supervised learning, and/or reinforcement learning.

The model layer 806 can implement the AI model using data from the data layer and the algorithm 816 and ML framework 814 from the structure layer 804, thus enabling decision-making capabilities of the AI stack. The model layer 806 can include any of a model structure 820, model parameters 822, a loss function engine 824, an optimizer 826, and a regularization engine 828.

The model structure 820 describes the architecture of the AI model of the AI stack. The model structure 820 defines the complexity of the pattern/relationship that the AI model expresses. Examples of structures that can be used as the model structure 820 include decision trees, support vector machines, regression analyses, Bayesian networks, Gaussian processes, genetic algorithms, and artificial neural networks (or, simply, neural networks). The model structure 820 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 820 may include one or more hidden layers of nodes between the input and output layers. The model structure 820 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, Variational Autoencoder (VAE), and Generative Adversarial Networks (GANs).

In some examples, neural networks can implement computer vision algorithms. Computer vision algorithms can perform object detection, object localization, semantic segmentation, pose estimation, and similar tasks. For example, to perform two-object detection, a Region Proposal Network (RPN) can generate a set of candidate regions that may contain a particular object. The region proposals (e.g., sets of pixel coordinates) can then be passed to a neural classifier network. To perform one-sweep object detection, a neural network can combine the object detection and classification operations. Once identified, objects can be localized. For example, objects can be marked with a bounding box, which can be, for example, identified by a convolutional neural network that generates a set of at least three coordinates in a particular pixel space. Further, semantic segmentation can be applied by convolutional neural networks to objects identified by the bounding boxes to identify regions of objects.

In some examples, neural networks can implement generative algorithms. Examples of neural networks that can implement generative algorithms include deep learning models, such as GANs, VAEs, and/or diffusion models.

In one example, to generate an image that includes a specified input object (for example, an object identified by a CNN), a computing platform can utilize a GAN. An example GAN consists of two neural networks: a generator and a discriminator. The generator can create new data instances, such as images, while the discriminator can evaluate them for authenticity. To include an input object in the generated image, the GAN can be trained using the input object as a conditioning variable. The conditioning variable can provide information to the generator about the specific object that should be included in the generated image. By learning about the input object as a conditional input during the training process, the generator can learn to produce images that incorporate the specified object. Once trained, the generator can take the input object and produce an image that includes the input object, based on the learned associations and patterns in the training data. This process allows GANs to generate images that contain specific input objects.

In another example, to generate an image that includes the specified input object, a computing platform can utilize a VAE. A VAE can be conditioned on the input object during the encoding and decoding process. The conditioning allows the VAE to learn the correlations between the input object and the corresponding image features. During generation, the conditioned VAE can produce an image that includes the specified object.

In another example, to generate an image that includes the specified input object, a computing platform can utilize a diffusion model. A diffusion model can iteratively update a set of pixel values to maximize the likelihood of the specified input object being present in the generated image. The diffusion process involves propagating the information regarding the input object through the image and influencing the generation of each pixel based on the conditional input that can include the specified input object. By iteratively applying the diffusion process, the model can generate an image that incorporates the specified input object.

The model parameters 822 represent the relationships learned by a model during training and can be used to make predictions and decisions based on input data. The model parameters 822 can weight and bias the nodes and connections of the model structure 820. For instance, when the model structure 820 is a neural network, the model parameters 822 can weight and bias the nodes in each layer of the neural networks, such that the weights determine the strength of the nodes and the biases determine the thresholds for the activation functions of each node. The model parameters 822, in conjunction with the activation functions of the nodes, determine how input data is transformed into desired outputs. The model parameters 822 can be automatically determined and/or altered during training of the algorithm 816.

The loss function engine 824 can determine a loss function, which is a metric used to evaluate the AI model's performance during training. For instance, the loss function engine 824 can measure the difference between a predicted output of the AI model and the actual output of the AI model and is used to guide optimization of the AI model during training to minimize the loss function. The loss function may be presented via the ML framework 814, such that a user can determine whether to retrain or otherwise alter the algorithm 816 if the loss function is over a threshold. In some instances, the algorithm 816 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 826 adjusts the model parameters 822 to minimize the loss function during training of the algorithm 816. In other words, the optimizer 826 uses the loss function generated by the loss function engine 824 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 826 used may be determined based on the type of model structure 820 and the size of data and the computing resources available in the data layer 802.

The regularization engine 828 executes regularization operations. Regularization is a technique that prevents over- and under-fitting of the AI model. Overfitting occurs when the algorithm 816 is overly complex and too adapted to the training data, which can result in poor performance of the AI model. Underfitting occurs when the algorithm 816 is unable to recognize even basic patterns from the training data such that it cannot perform well on training data or on validation data. The optimizer 826 can apply one or more regularization techniques to fit the algorithm 816 to the training data properly, which helps constrain the resulting AI model and improves its ability for generalized application. Examples of regularization techniques include lasso (L1) regularization, ridge (L2) regularization, and elastic (L1 and L2 regularization).

Further Examples

FIG. 9 is a flowchart illustrating example operations 900 of the signal transformation system 106, according to some arrangements. At 910, the operations can include receiving an inbound signal comprising a payload including first alphanumeric data. At 920, the operations can include, using the payload (e.g., using first alphanumeric data), retrieving anatomy image data and applying a computer vision model to the anatomy image data to generate an attribute set An, wherein the attribute set An comprises second alphanumeric data generated based on the anatomy image data. At step 930, the operations can include causing a trained model to process the attribute set An to generate a classifier for the data signal. At step 940, the operations can include, using the classifier, generating the routing data to include in the data signal, wherein the routing data comprises an agentic AI instruction, a target computing system identifier.

In some implementations, operations include, using the classifier, generating a supplemental data set comprising resource negotiation information; and binding the supplemental data set to the data signal. In some implementations, operations include executing the agentic AI instruction to invoke an autonomous agent configured to perform computer-based operations using the supplemental data set. In some implementations, operations include causing the autonomous agent to generate a resource negotiation plan using the event date and an estimated expected value associated with the data signal, wherein the estimated expected value is calculated using the supplemental data set.

In some implementations, operations include generating an incremental training data set using the attribute set An and event data and causing the trained model to update model configuration information by learning using the incremental training data set, wherein the model configuration information comprises at least one of node information, weight information, or activation function.

In some implementations, the routing data comprises an instruction to route the data signal to a particular target computing system based at least on the classifier, the operations further comprising transmitting the data signal to the particular target computing system.

In some implementations, operations include binding the data signal with ontology data store information sufficient to retrievably access an ontology; and validating the second alphanumeric data against the ontology.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computer-implemented method executed by a signal transformation computing system, the method comprising operations that reduce false positive lien identification compared with ETL (extract, transform, load) processing:

receiving, by the signal transformation computing system, an inbound signal having a payload comprising first alphanumeric data, the first alphanumeric data comprising event data including an event date, the first alphanumeric data relating to a claim;

using at least a portion of the payload, retrieving anatomy image data;

inputting the anatomy image data to a computer vision model to generate an attribute set An, where in the computer vision model applies pattern recognition to identify patterns in the anatomy image data, wherein the anatomy image data is processed in combination with the event date to determine that the claim is related to a specific event or incident, wherein the attribute set An comprises second alphanumeric data generated using the anatomy image data, and;

inputting the attribute set An into one or more nodes of a trained model to generate a classifier for a data signal;

using the generated classifier, generating routing data to include in the data signal, wherein the routing data comprises an agentic artificial intelligence (AI) instruction, a target computing system identifier, or both;

linking (i) the attribute set An, (ii) the event data, and (iii) routing data to generate the data signal;

using the data signal, causing an autonomous agent to generate an electronic command, the electronic command configured at least in part using (i) the attribute set An, (ii) the event data, and (iii) the routing data;

generating an incremental training data set using the attribute set An and event data; and causing the trained model to update model configuration information by learning the incremental data set, wherein the model configuration information comprises at least one of node information, weight information, or activation function.

2. The method of claim 1, further comprising:

using the classifier, generating a supplemental data set comprising resource negotiation information; and binding the supplemental data set to the data signal.

3. The method of claim 2, further comprising:

executing the agentic AI instruction to invoke the autonomous agent configured to generate the electronic command using the supplemental data set.

4. The method of claim 3, further comprising:

causing the autonomous agent to generate a resource negotiation plan using the event date and an estimated expected value associated with the data signal, wherein the estimated expected value is calculated using the supplemental data set.

5. The method of claim 1, wherein the routing data comprises an instruction to route the data signal to a particular target computing system based at least on the classifier, the method further comprising transmitting the data signal to the particular target computing system.

6. The method of claim 1, further comprising:

binding the data signal with ontology data store information sufficient to retrievably access an ontology; and validating the second alphanumeric data against the ontology.

7. A signal transformation computing system having at least one processor and at least one memory having computer-executable instructions stored therein that, when executed by the at least one processor, cause the signal transformation computing system to perform operations that reduce false positive lien identification compared with ETL (extract, transform, load) processing, the operations comprising:

receiving, by the signal transformation computing system, an inbound signal having a payload comprising first alphanumeric data comprising event data including event date, the first alphanumeric data relating to a claim;

using at least a portion of the payload, retrieving anatomy image data and inputting the anatomy image data to a computer vision model to generate an attribute set An, where in the computer vision model applies pattern recognition to identify patterns in the anatomy image data, where in the anatomy image data is processed in combination with the event date to determine that the claim is related to a specific event or incident, wherein the attribute set An comprises second alphanumeric data generated using the anatomy image data, and causing a trained model to process the attribute set An to generate a classifier for a data signal;

using the classifier, generating routing data to include in the data signal, wherein the routing data comprises an agentic artificial intelligence (AI) instruction, a target computing system identifier, or both;

linking (i) the attribute set An, (ii) the event data, and (iii) routing data to generate the data signal;

using the data signal, causing an autonomous agent to generate an electronic command, the electronic command configured at least in part using (i) the attribute set An, (ii) the event data, and (iii) the routing data;

generating an incremental training data set using the attribute set An and event data; and causing the trained model to update model configuration information by learning the incremental data set, wherein the model configuration information comprises at least one of node information, weight information, or activation function.

8. The system of claim 7, the operations further comprising:

using the classifier, generating a supplemental data set comprising resource negotiation information; and binding the supplemental data set to the data signal.

9. The system of claim 8, the operations further comprising:

executing the agentic AI instruction to invoke an autonomous agent configured to perform computer-based operations using the supplemental data set.

10. The system of claim 9, the operations further comprising:

causing the autonomous agent to generate a resource negotiation plan using the event date and an estimated expected value associated with the data signal, wherein the estimated expected value is calculated using the supplemental data set.

11. The system of claim 7, wherein the routing data comprises an instruction to route the data signal to a particular target computing system based at least on the classifier, the operations further comprising transmitting the data signal to the particular target computing system.

12. The system of claim 7, the operations further comprising:

binding the data signal with ontology data store information sufficient to retrievably access an ontology; and validating the second alphanumeric data against the ontology.

13. One or more non-transitory computer-readable media having computer-executable instructions stored thereon that, when executed by at least one processor, cause a signal transformation computing system to perform operations that reduce false positive lien identification compared with ETL (extract, transform, load) processing, the operations comprising:

receiving, by the signal transformation computing system, an inbound signal having a payload comprising first alphanumeric data comprising event data including event date, the first alphanumeric data relating to a claim;

using at least a portion of the payload, retrieving anatomy image data and inputting the anatomy image data to a computer vision model to generate an attribute set An, where in the computer vision model applies pattern recognition to identify patterns in the anatomy image data, where in the anatomy image data is processed in combination with the event date to determine that the claim is related to a specific event or incident, and wherein the attribute set An comprises second alphanumeric data generated using the anatomy image data;

causing a trained model to process the attribute set An to generate a classifier for a data signal;

using the classifier, generating routing data to include in the data signal, wherein the routing data comprises an agentic artificial intelligence (AI) instruction, a target computing system identifier, or both;

linking (i) the attribute set An, (ii) the event data, and (iii) routing data to generate the data signal;

generating an incremental training data set using the attribute set An and event data; and causing the trained model to update model configuration information by learning the incremental data set, wherein the model configuration information comprises at least one of node information, weight information, or activation function.

14. The media of claim 13, the operations further comprising:

using the classifier, generating a supplemental data set comprising resource negotiation information; and binding the supplemental data set to the data signal.

15. The media of claim 14, the operations further comprising:

executing the agentic AI instruction to invoke an autonomous agent configured to perform computer-based operations using the supplemental data set.

16. The media of claim 15, the operations further comprising:

causing the autonomous agent to generate a resource negotiation plan using the event date and an estimated expected value associated with the data signal, wherein the estimated expected value is calculated using the supplemental data set.

17. The media of claim 13, the operations further comprising:

binding the data signal with ontology data store information sufficient to retrievably access an ontology; and validating the second alphanumeric data against the ontology.

* * * * *